June 14, 1966 JEAN-PIERRE M. AUBRY 3,255,901
VEHICLE FOR PLACING IN POSITION AND REMOVING WATERING
PIPES FOR CULTIVATIONS
Filed Nov. 2, 1964 3 Sheets-Sheet 3
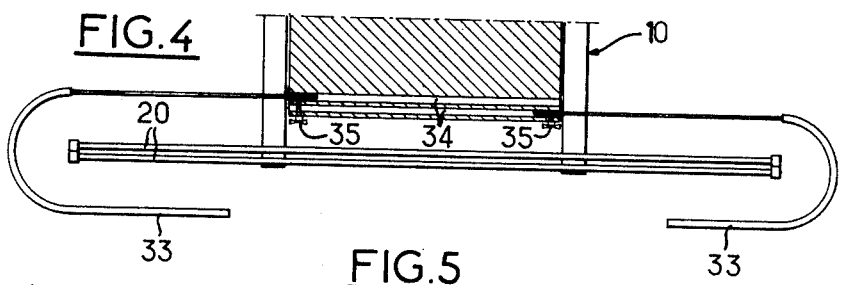
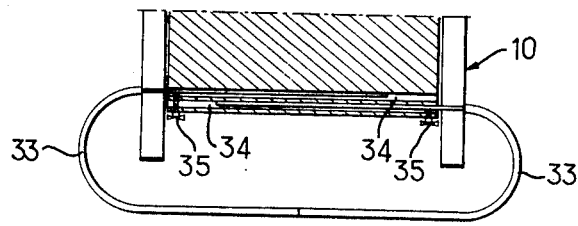
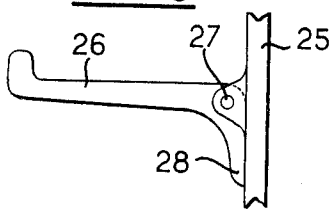
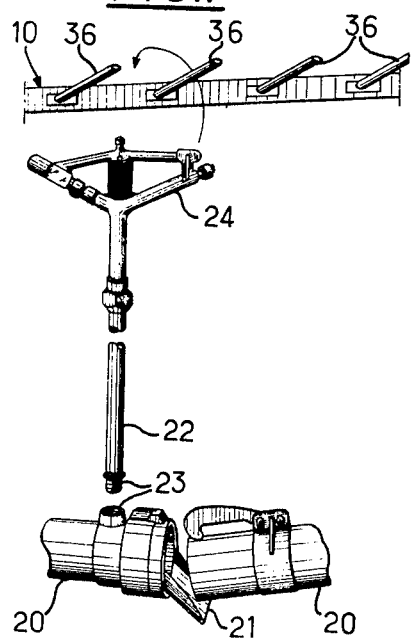
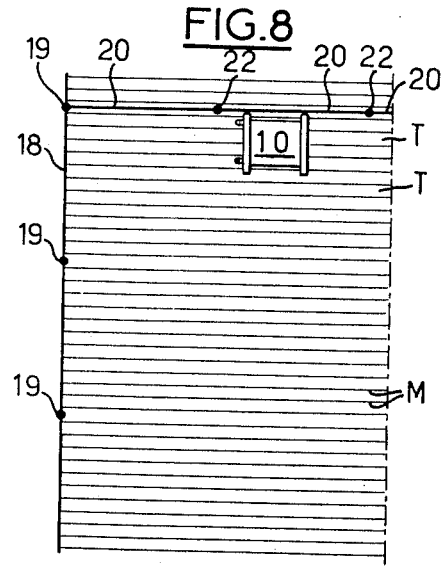
INVENTOR
JEAN-PIERRE M. AUBRY
BY Irwin S. Thompson
ATTY.

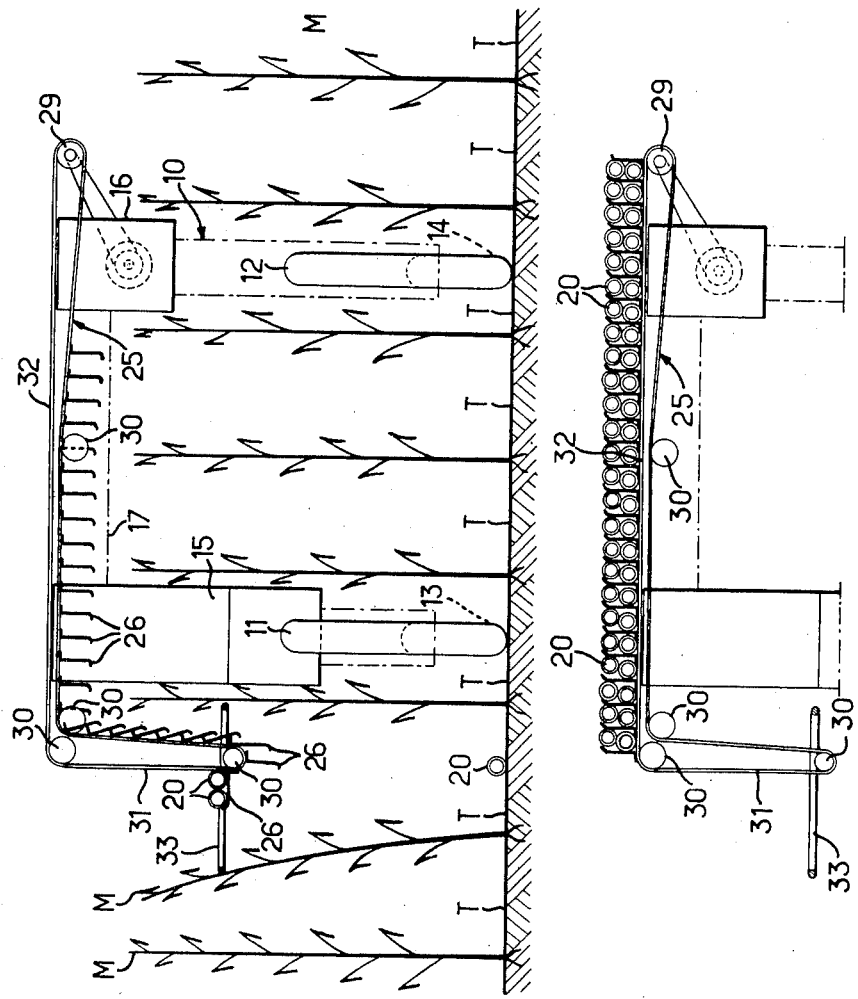

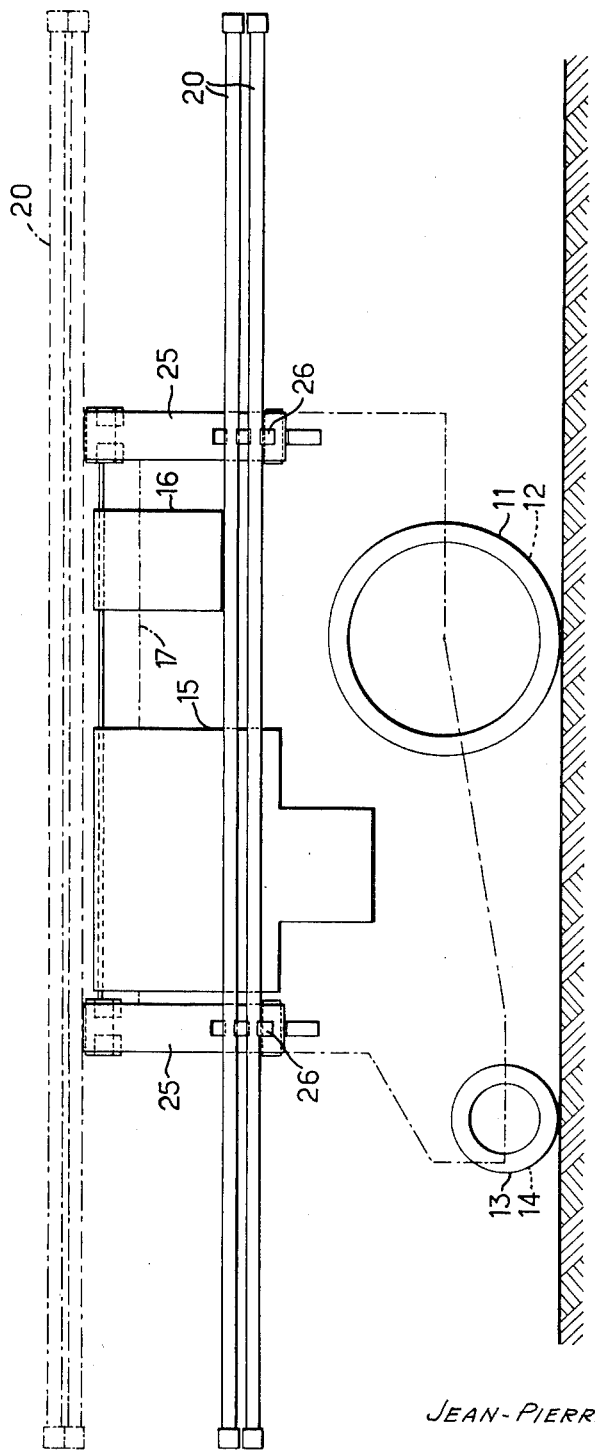

3,255,901
VEHICLE FOR PLACING IN POSITION AND REMOVING WATERING PIPES FOR CULTIVATIONS
Jean-Pierre Marcel Aubry, 1 Rue Edgar Poe, Paris, France
Filed Nov. 2, 1964, Ser. No. 408,044
Claims priority, application France, Nov. 8, 1963, 953,100
5 Claims. (Cl. 214—83.36)

The present invention has for its object a high-clearance vehicle for bringing into position and removing hose-pipes for watering fields of plants, the said vehicle being particularly characterized in that it comprises conveyor means which stack the hose-pipes parallel to the direction of movement of the vehicle, and which are movably mounted transversely to the said direction so as to displace each pipe between a taking-off position located on one side of the vehicle and a stacking position located at the upper portion of the vehicle.

In accordance with a further characteristic feature, the conveyor means comprise an endless element such as a belt or chain, having a non-linear elbowed travel with one portion disposed on the side of the vehicle and another portion disposed along the upper part of the vehicle, the said element being provided with a series of hooked arms for supporting and partitioning-off the pipes from each other. Preferably, two endless elements are provided, one at the front and the other at the rear of the vehicle, so as to support the pipes at two points spaced apart, the pipes extending beyond the said supporting points at each extremity.

In accordance with another characteristic feature, deflecting means are arranged on the said vehicle opposite the side portion of the said conveyor means, so as to push aside the leaves of the growing plants during the passage of the vehicle. In one form of construction, these deflecting means comprise a frame mounted on the vehicle and arranged to be displaceable into an extended position of operation in which the frame surrounds the pipes in the taking-off position on the conveyor means and a retracted position of stowage on the said vehicle.

In addition, according to the invention, the vehicle is provided with supports from which may be suspended spraying tubes which can be removably fitted on the hose-pipes.

The objects, characteristic features and advantages of the invention will furthermore be brought out from the description which follows below of one form of embodiment, selected by way of example, reference being made to the accompanying drawings, in which:

FIG. 1 is a front view of a vehicle according to the invention, in which the stacking conveyor is almost empty of hose-pipes;

FIG. 2 is a partial view similar to FIG. 1, but in which the stacking conveyor is full of hose-pipes;

FIG. 3 is a side view of the vehicle;

FIGS. 4 and 5 show, in plan view and on a smaller scale, the frame for pushing aside the leaves, in its two positions, extended and retracted respectively;

FIG. 6 is a detail view of a hooked arm of the stacking conveyor;

FIG. 7 is an exploded diagrammatic view in perspective of the assembly of a spraying tube on the hose-pipes, and of a support mounted on the vehicle for receiving the spraying tubes;

FIG. 8 shows diagrammatically and partially a field in which a vehicle according to the invention is employed for changing the positions of watering pipes.

In the form of embodiment shown, which concerns, by way of example and without limitation, an application of the invention to a high-clearance vehicle for bringing into position and removing hose-pipes for the purpose of watering maize or other crops, there can be seen at 10 in FIGS. 1 and 3, the high-clearance vehicle with two driving wheels 11 and 12 of large diameter and two steering wheels 13 and 14 of small diameter, at 15 the driving cabin arranged above the wheels 12 and 14 of the other side of the vehicle and at 17 the chassis which is provided with driving and transmission members and which couples together the cabin 15 and the engine 16 at the upper portion of the vehicle so as to pass over the maize.

As can be seen from FIG. 1, when the vehicle is engaged in a field of maize having rows of plants M uniformly spaced apart by bays T, the wheels 11 and 13 and the cabin 15 occupying one of the bays T, while the wheels 12 and 14 and the engine 16 occupy another bay T separated from the first by several rows M of maize (three in the example of FIG. 1) which are bridged over by the upper chassis 17. The vehicle can thus pass along the field to-and-fro, by moving along the said bays T (see FIG. 8).

For watering the maize, a collector conduit 18 is provided along the edge of the field (FIG. 8) and has connection points 18 suitably spaced apart. Each connection point 19 is intended to supply a piping system placed in one of the bays T and composed of hose-pipes 20 placed end-to-end and coupled together by couplings 21 (FIG. 7) which can be instantaneously connected and removed, while tubes 22, located vertically in the position of use, are connected to the pipes 20, preferably in the vicinity of the couplings 21, the rapid connection and removal, for example by screwing at 23 or otherwise. Each tube 22 is provided at its upper extremity with a spraying head 24.

In order that the watering of the field can be carried out with a small number of pipes 20 and tubes 22, for example the number of pipes and tubes which corresponds to a piping system connectable to one of the points 19, it is envisaged to make use of this single piping system for watering the whole field by proceeding in successive stages. The piping system is first connected to one of the points 19 and then, after watering the corresponding zone, it is disconnected from this point and taken apart so as to be subsequently re-connected to another point 19 in order to water a fresh zone.

The vehicle 10 is designed and arranged so as to transport the pipes 20 and the tubes 22 for the purpose of facilitating such operations of changing the position of the piping system.

To this end, the vehicle 10 comprises conveyor means which stack the pipes 20 parallel to the direction of movement of the vehicle and which are composed of two endless elements 25, provided one at the front and the other at the rear of the vehicle, so as to support the pipes 20 at two supporting points 26, spaced apart, beyond which the pipes 20 may project at each extremity (FIG. 3).

Each endless element 25 is provided with a series of arms 26 which form the supporting points. Each arm 26 has a length such that it can receive one or more pipes 20 side by side (two pipes 20 in the example shown in FIG. 1). Each arm 26 is articulated at 27 (FIG. 6) on the endless element 25 and is provided with a lug 28 forming a one-way abutment.

Each endless element 25, constituted by a belt or chain, passes as shown in FIG. 1 over a driving pulley 29 and return pulleys 30, arranged in such manner that the travel of the endless element 25 is elbowed, with one vertical side portion 31 placed along the side of the vehicle 10, and a horizontal upper portion 32, placed on the top of the vehicle 10. As can be seen from FIG. 1, when the vehicle is engaged in two bays T, the side portion 31 extends into the adjacent bay on the outer side of that occupied by the wheels 11 and 13 and the cabin 15, while the upper portion 32 overhangs the maize plants M. The driving pulleys 29 of the two endless elements 25 are conjointly operated and can be driven from the engine 6 through the intermediary of an appropriate drive.

When the pulleys 29 are driven, the endless elements 25 are moved transversely to the direction of movement of the vehicle. Each pipe 20 supported by the arms 26 can be displaced during the course of this movement between a taking-off position (FIG. 1) located at the bottom of the portion 31 and a stacked position (FIG. 2) located in the portion 32. In FIG. 1, the conveyor is shown empty of pipes 20, except on the arms 26 occupying the taking-off position, while the other arms 26 are disposed behind the portion 31 and under the portion 32, and hang freely by the action of the articulations 27. In FIG. 2, the conveyor is shown full of pipes 20, all placed in the stacked position on the portion 32 and partitioned by the arms 26 which are swung back vertically.

A frame 33 (FIGS. 1, 4 and 5) is mounted on the vehicle opposite the side portion 31 of the conveyor 25 and forms a deflecting means for pushing aside the leaves during the passage of the vehicle. The frame 33 can take-up at will either an extended working position (FIG. 4) in which it surrounds the pipes 20 placed in the taking-off position on the conveyor 25, or a retracted position of stowage (FIG. 5) in which it practically does not increase the overall bulk of the vehicle. The frame 33 comprises for example two parts slidably engaged in slides 34 on the vehicle and which can be locked by screws 35 in each of the positions of working and stowage.

The vehicle 10 is further provided with supports 36 (FIG. 7) from which the tubes 22 can be suspended by their heads 24.

In order to change the position of the piping system consisting of the pipes 20 and the tubes 22 (FIG. 8), that is to say to change this piping system over from a connection to a point 19 to a connection to another point 19, the vehicle is caused to pass through the field from the right-hand to the left-hand side of FIG. 8, the portion 31 and the frame 33 being engaged in the bay T in which is placed the line of pipes 20. During this displacement of the vehicle, an assistant removes the tubes 22 and hangs them on the supports 36. When the vehicle has reached the collector conduit 18, the assistant removes the connection 19. The vehicle then passes along the field in the opposite direction, in the same bays. During this time, the assistant disconnects the pipes 20 and places them on the arms 26 which are in the taking-off position (FIG. 1), that is to say within easy reach. The driver of the vehicle who watches this operation causes the conveyor elements 25 to move as and when the assistant deposits the pipes 20 on the arms 26, in such manner that the assistant can always find a place available on the arms 26 brought into the taking-up position, that is to say within easy reach, at the moment when he needs to stow away a pipe which he has just collected. The frame 33 which is in its extended position, facilitates this operation.

When the vehicle reaches the end of the field opposite to the collector conduit 18, all the pipes have been stacked on the upper portion 32 of the conveyor, that is to say above the maize plants. The frame 33 is put into its retracted position on the vehicle.

The vehicle passes out of the field and re-enters a little farther away, that is to say with the portion 31 and the frame 33 engaged in the bay T in which the piping system is to occupy its new position. The frame 33 is put into its extended working position. The vehicle passes through the field from the right-hand to the left-hand side of FIG. 8 up to the collector conduit 18. At that moment, the assistant takes a first pipe 20 from the arms 26 placed in the taking-off position, places this pipe on the ground and connects it to the new connection point. 19.

The vehicle starts-off again in the opposite direction, that is to say towards the right-hand side of the field, and the assistant takes the pipes 20 in succession from the arms 26 placed within his reach, puts the pipes 20 on the ground one after the other and connects the couplings 21. The assistant also removes the tubes 22 from the supports 36 and fixes them at 23 on the pipes 20. During this displacement of the vehicle, the driver who is watching the operation causes the conveyor elements to move as and when the assistant takes the pipes 21 to put them on the ground, in such manner that the assistant can always find a pipe available on the arms 26 brought into the taking-off position, that is to say within easy reach, at the moment when he needs to take another pipe to put on the ground. In this case also, the frame 33 in its extended position facilitates the operation.

From the foregoing description it will be clear that the present invention comprises a high clearance vehicle for placing in position and subsequently removing hose-pipes for watering cultivated plants, of the kind adapted to receive the pipes parallel to the direction of movement of the vehicle and comprising endless elements provided with a plurality of hooked arms for supporting and conveying the said pipes in a movement transverse to the said direction, between a position located on the side of the vehicle and a stacked position in which the said conveyor elements and their associated hooked arms extend not only down the side but also along the top of the vehicle, so that in the stacked position of the pipes on the top of the vehicle, the arms serve as partitions for the pipes and enable a programme of handling to the adopted for the pipes, both for stacking and taking-off.

It will also be appreciated that the endless conveyor elements are displaceable in two directions, forward and return, the forward movement bringing the pipes from the side on to the top of the vehicle for stacking the recovered pipes and the return movement bringing back the pipes from the top to the sides so that they can be removed in the reverse order to that in which they have been stacked.

It will of course be understood that the invention is not restricted to the form of construction described and shown, but covers all its alternative forms.

What I claim is:

1. A high-clearance vehicle for bringing into position and removing hose pipes for watering fields of plants, said vehicle comprising conveyor means adapted to stack said hose pipes parallel to the direction of movement of the vehicle, said conveyor means being movably mounted transversely to said direction so as to move each pipe between a taking-off position located on one side of said vehicle and a stacking position located at the upper portion of said vehicle, said conveyor means comprising an endless element such as a belt or chain, having a non-linear elbowed travel with one portion of said travel disposed along the side of the vehicle and another portion along the upper part of said vehicle, said endless element being provided with a plurality of hooked arms serving to support and to partition off said pipes from each other.

2. A high-clearance vehicle as claimed in claim 1, in which two said endless elements are provided, one at the front the other at the rear of said vehicle, so as to support said pipes at two points spaced apart, the pipes extending beyond said supporting points at each extremity.

3. A high-clearance vehicle as claimed in claim 1, in which the length of each said hooked arm is such as to receive at least two pipes lying side by side.

4. A high-clearance vehicle as claimed in claim 1, in which each said hooked arm is articulated on said endless element and is provided with a one-way abutment on said articulation.

5. A high-clearance vehicle for bringing into position and removing hose pipes for watering fields of plants, said vehicle comprising conveyor means adapted to stack said hose pipes parallel to the direction of movement of the vehicle, said conveyor means being movably mounted transversely to said direction so as to move each pipe between a taking-off position located on one side of said vehicle and a stacking position located at the upper portion of said vehicle, and deflecting means disposed on said vehicle opposite the side portion of said conveyor means, so as to push aside the leaves of the growing plants during the passage of said vehicle, said deflecting means comprising a frame mounted on said vehicle and adapted to be moved into an extended working position in which said frame surrounds the pipes occupying the taking-off position on said conveyor means and a retracted position of stowage on said vehicle.

References Cited by the Examiner

UNITED STATES PATENTS

| | | |
|---|---|---|
| 2,780,376 | 2/1957 | Sanders _____ 214—83.36 X |
| 2,788,141 | 4/1957 | Hendrix _____ 214—83.1 |
| 3,034,668 | 5/1962 | Wicks. |
| 3,057,489 | 10/1962 | Gilliam _____ 214—83.36 |
| 3,083,842 | 4/1963 | Bauer et al. _____ 214—2.5 |
| 3,110,390 | 11/1963 | Marvin _____ 214—83.26 X |

GERALD M. FORLENZA, *Primary Examiner.*

HUGO O. SCHULZ, *Examiner.*

A. J. MAKAY, *Assistant Examiner.*